Jan. 19, 1926. 1,569,931
R. B. HERRINGTON
CHICKEN FEEDER
Filed Feb. 3, 1925
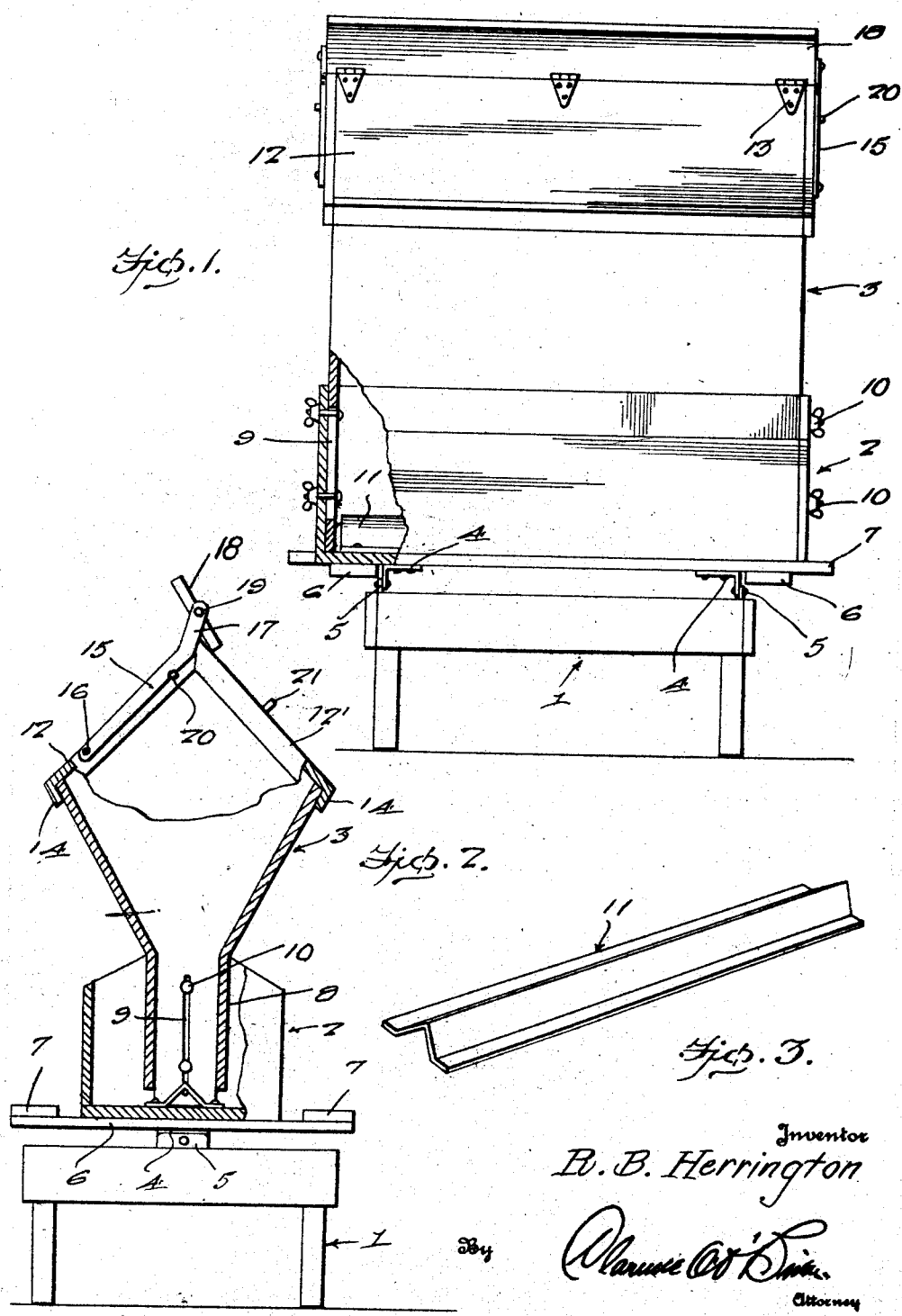

Patented Jan. 19, 1926.

1,569,931

UNITED STATES PATENT OFFICE.

RANCY BLAIN HERRINGTON, OF WOLBACH, NEBRASKA.

CHICKEN FEEDER.

Application filed February 3, 1925. Serial No. 6,567.

*To all whom it may concern:*

Be it known that I, RANCY B. HERRINGTON, a citizen of the United States, residing at Wolbach, in the county of Greeley and State of Nebraska, have invented certain new and useful Improvements in a Chicken Feeder, of which the following is a specification.

This invention relates broadly to a poultry feeding device, and it has more specific reference to a device of this class which is particularly adapted for feeding chickens.

The object of the invention is to generally improve upon devices of this class by providing one of comparative simplicity and durability which embodies improved structural details from which important advantages result. These constructional differences will become apparent from the following description and drawing.

In the accompanying drawing forming a part of this application and in which like numerals are employed to designate like parts throughout the same:

Figure 1 is an elevation, with a portion broken away and shown in section, of a chicken feeder constructed in accordance with the present invention.

Figure 2 is an end view partly in section and partly in elevation showing the construction and arrangement of parts more clearly, and Figure 3 is a detail perspective view of one of the parts of the improved device.

Referring to the drawing, it will be seen that the reference character 1 designates generally an appropriate table or stand upon which the feeder is supported. The feeder itself is composed mainly of a trough 2 and a hopper 3 for automatically dispensing feed into the trough to be rendered accessible to the chickens. In the present instance the trough is open at its top, the same being of elongated rectangular design and being provided on its bottom with L-shaped brackets 4 which are pivotally connected to upstanding lugs or their equivalent 5 carried by the table. This permits rocking or oscillation of the trough. Connected to and extending crosswise of and beyond the bottom of the trough are end pieces 6 of a frame. Connected to the extended end portions of the pieces 6 are longitudinal strips 7 constituting rests upon which the chickens are adapted to perch when feeding.

As before stated, the hopper 3 serves to automatically discharge feed into the trough. In the present instance the hopper comprises a body, the upper portion of which is substantially V-shaped in cross section and the lower portion of which provides a constricted discharge neck 8. The neck has its end walls equipped with vertically elongated slots 9 and removable bolts or their equivalent 10 extend through the corresponding walls of the trough and the slots to adjustably connect the hopper with the trough, permitting the elevation of the hopper to be varied to control the discharge of feed. The neck 8 is open at its bottom and disposed beneath the open bottom is a V-shaped spreader plate 11, the apex of which is located at the center of the neck for the purpose of equally dividing and shifting the feed to opposite sides into the trough.

The hopper is open at its top and hinged covers 12 and 12' are provided for closing it, the covers being hingedly connected together at their meeting edges as indicated at 13. The lower portions of the covers are provided with marginal strips 14 to take over the upper end of the hopper to insure a tight closure. Attention is directed to the fact that the covers are disposed in downwardly diverging relation to render the inclination comparatively steep.

I also wish to direct attention to the fact that the width of the upper portion of the hopper is greater than the width of the trough 2 for a purpose to be hereinafter described.

It will be noted that a pair of duplicate arms or swinging brackets 15 are pivoted at 16 to the end flanges of the left hand cover seen in Figure 2, the free ends of these arms being upturned as indicated at 17 and the extremities thereof being connected with a rocking board 18 which is interposed therebetween and pivoted thereto at 19. It will be noted also that adjacent their upturned ends, the arms are provided with notches for reception of outstanding stop pins 20. It is yet to be pointed out that the stationary cover 12' is provided with a laterally directed stop pin 21 which comes into play in the manner described.

In use, the hinged cover 12 is swung open and the feed is placed into the hopper in the ordinary way. When the cover swings open upon the hinges 13 it is obvious that it carries the pivoted ends 16 of the arms 15 upwardly with it. In so doing the board 18 swings over top of the stationary cover 12' and when the movable cover is completely open, it rests against the stop pin 21 to maintain the cover in open position. Here it might logically be stated that the board 18 is normally readily movable about its pivot point and prevents chickens from resting thereon. Frequently, in devices of this class the chickens rest upon the hopper and unavoidable dirt is sometimes deposited into the trough. The swingable board 18 will prevent the chickens from resting on it. In some instances if a number of chickens collect on the board 18, it will swing together with the arm 15 over in a direction from right to left in Figure 2 and literally throw the chickens off of the hopper. After the cover is closed, the feed has in the meantime gravitated downwardly through the discharge neck 8 and through the medium of the spreader plate 11 is cast in opposite direction into the trough and as it is consumed more feed gradually feeds downward. The feed may be consumed as is obvious by elevating the hopper to adjust the distance between the discharge neck and the spreader plate. In eating, the chickens roost or perch upon the board 7 and in moving about, the trough and hopper are bodily rocked side to side, thus aiding in the automatic delivery of feed.

The foregoing and other features and advantages of the invention will become apparent from the foregoing description in connection with the drawing. Therefore, a more lengthy description is not necessary.

Although I have shown and described the preferred embodiment of the invention, it is to be understood that minor changes coming within the field of invention claimed may be resorted to if desired.

Having thus described the invention, what I claim is:—

1. In a structure of the class described, a hopper, inclined covers for the same, one cover being stationary and the other cover being pivotally mounted, arms pivotally connected to the pivotally mounted cover, and a board pivotally connected to said arms and adapted for disposition above the meeting edges of the covers.

2. In a structure of the class described, a supporting table, a feed trough pivotally mounted thereon, a roosting frame carried by said trough, a hopper adjustably mounted upon said trough, said hopper being open at its top, relatively stationary and movable covers for said hopper, arms pivotally connected to the movable cover, and a board pivoted to the free ends of the arms and located above the meeting edges of said covers.

3. In a structure of the class described, a hopper, inclined covers for the top thereof, one cover being stationary, and the other cover being pivotally connected thereto, a stop carried by the stationary cover, an anti-roost board normally disposed above the meeting edges of the covers, means pivotally connecting said board to the relatively movable cover, said board being in turn pivotally connected upon said means, and said board being engageable with said stop when the movable cover is in raised position.

4. In a structure of the class described, a feed hopper, said hopper being open at its top, a pair of cover sections for closing said top, one of said sections being stationary, and the other section being relatively movable, a pair of arms pivotally connected at corresponding ends to the intermediate portion of the ends of the movable cover section, an anti-roost board disposed between and pivotally connected to the opposite ends of said arms, stop pins disposed upon the ends of said movable cover section, the intermediate portions of the arms being engageable with said stop pins, and an additional stop pin on the relatively stationary cover section with which said board is engageable when the movable section is swung to open position.

In testimony whereof I affix my signature.

RANCY BLAIN HERRINGTON.